Figure 1:
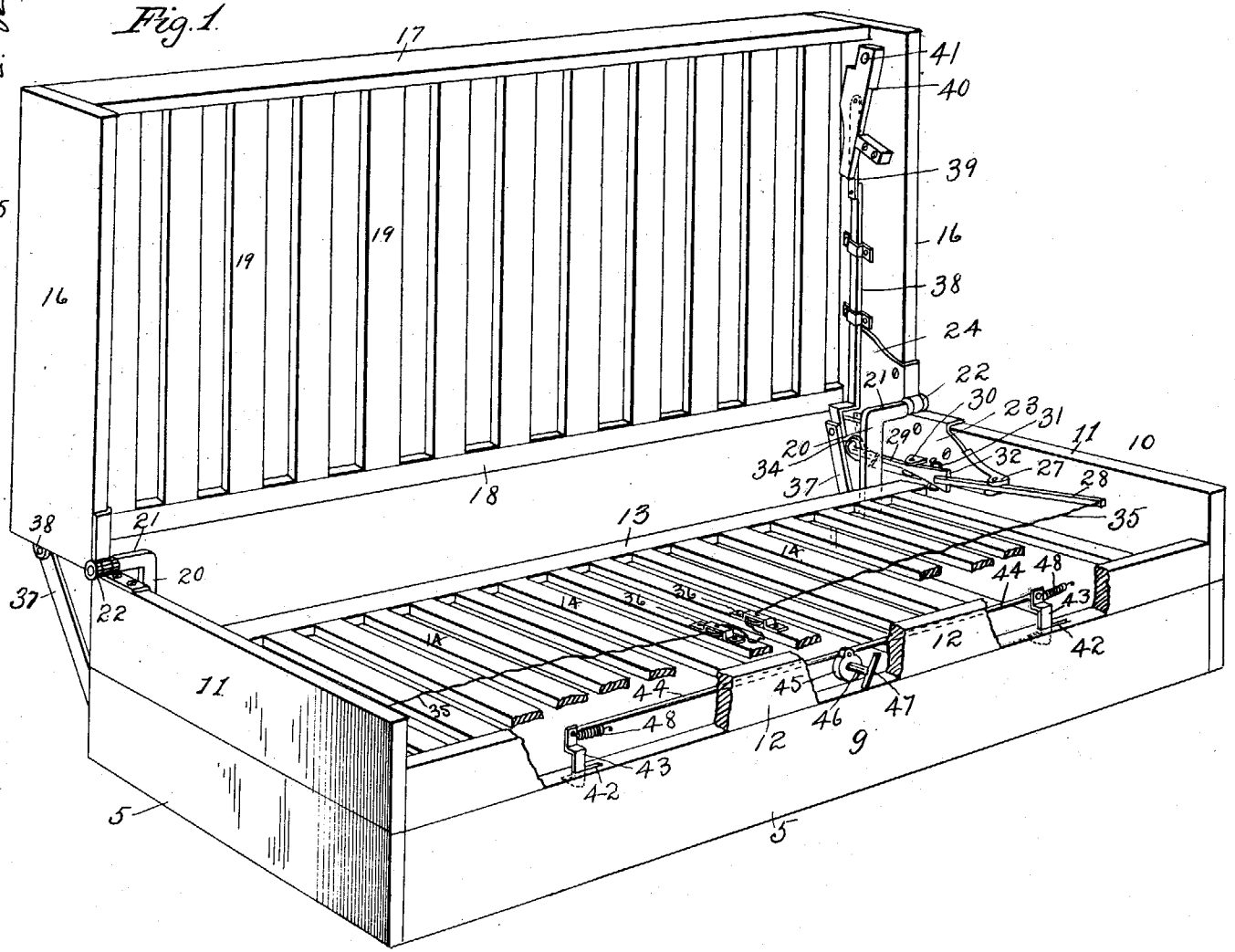

No. 11,831. Reissued June 19, 1900.

W. T. ROLPH.

SOFA BED.

(Application filed Apr. 16, 1900.)

2 Sheets—Sheet 1.

Witnesses

C. F. Kilgore

H. F. Woodard

Inventor

William T. Rolph

No. 11,831.

Reissued June 19, 1900.

W. T. ROLPH.

SOFA BED.

(Application filed Apr. 16, 1900.)

2 Sheets—Sheet 2.

Witnesses

C. F. Kilgore

H. F. Mordard

Inventor

William T. Rolph

UNITED STATES PATENT OFFICE.

WILLIAM T. ROLPH, OF MINNEAPOLIS, MINNESOTA.

SOFA-BED.

SPECIFICATION forming part of Reissued Letters Patent No. 11,831, dated June 19, 1900.

Original No. 585,122, dated June 22, 1897. Application for reissue filed April 16, 1900. Serial No. 13,151.

*To all whom it may concern:*

Be it known that I, WILLIAM T. ROLPH, a citizen of the United States of America, residing in the city of Minneapolis, county of Hennepin, and State of Minnesota, have invented a certain new and useful Improvement in Sofa-Beds, of which the following is a specification, such as will enable those skilled in the art to which it relates to make and use the same.

This invention relates to combination sofas and beds; and one object thereof is to provide an improved device of this class which may be used either as a sofa or as a bed whenever desired and which may be converted from a sofa to a bed without the necessity of going behind the same to open or close it.

A further object is to provide a combined sofa and bed which comprises, in addition to these articles, a box for bedding, the cover of which when raised is held automatically in the open position.

A further object is to provide a combined sofa and bed wherein the seat and back are automatically locked together when such seat and back are brought to a substantially right-angular position with respect to each other, so that when used as a sofa the back is thereby held in a vertical position, and when the back is moved to a horizontal position the seat may thereby be held in a vertical position to give free access to the base or clothes box.

A further object is to provide a combined sofa and bed in which the seat and back portions will be pivotally supported from the base-box and adapted to swing on their pivots independently of each other or be so locked together as to be capable of swinging together without change of relative position to each other.

A further object is to provide suitable means for accomplishing these purposes in the most simple, convenient, durable, and economical form.

To these ends my invention consists in the provision of a combined sofa and bed comprising a base-box, a seat and back, standards or rods rising from said base-box and upon which said seat and back are independently pivoted or hinged, and means for locking said seat and back together, so that said seat and back are adapted to pivotal movement without change of their relative position to each other, and for releasing said seat and back, so that the same are capable of independent pivotal movement.

The invention consists, further, in various constructions and combinations of parts, all as hereinafter described, and particularly pointed out in the claims.

The invention is fully described in the following specification, of which the accompanying drawings form a part, in which similar numerals of reference designate like or equivalent parts wherever found throughout the several views, and in which—

Figure 2:
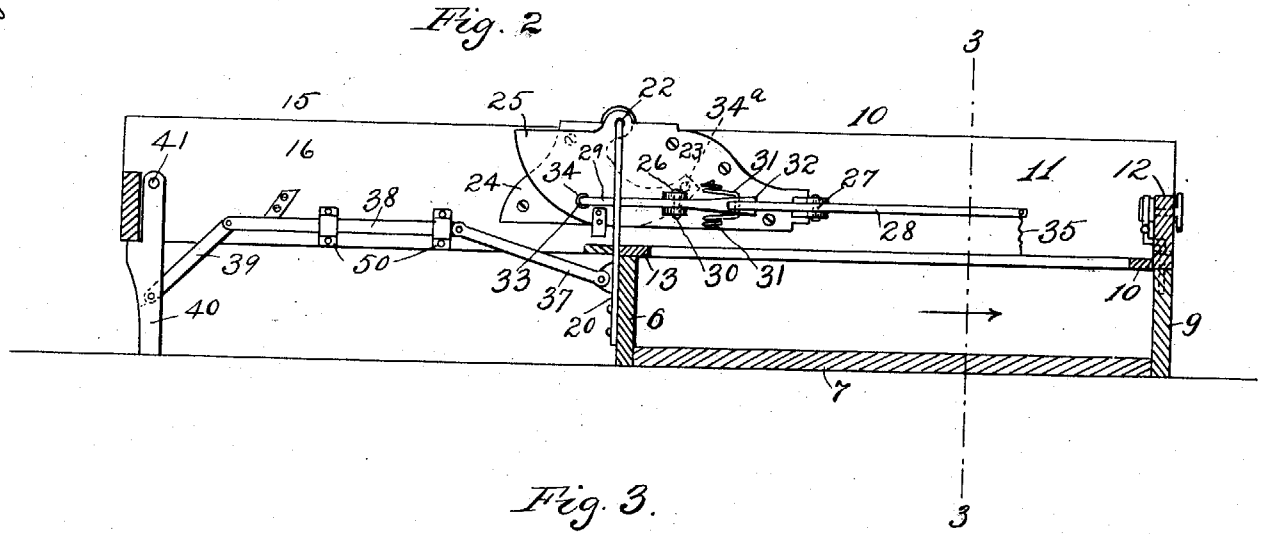
Figure 3:
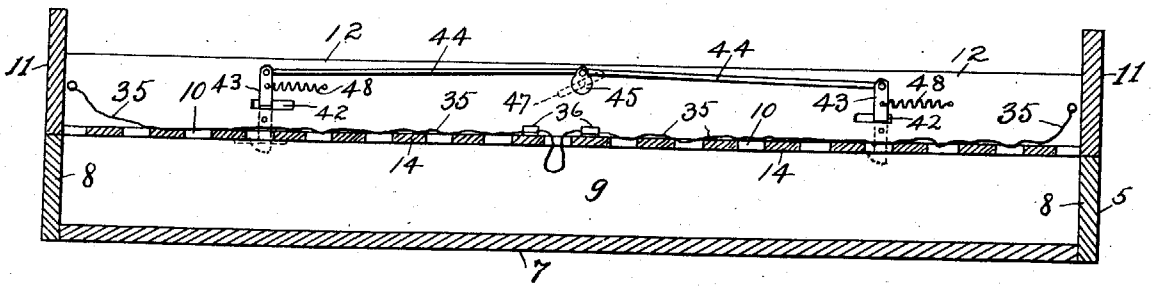

Figure 1 is a perspective view of the frame of my improved combined sofa and bed, the separate parts being in the position they occupy when the device is used as a sofa. Fig. 2 is a transverse section with the parts in the position they occupy when the device is used as a bed, and Fig. 3 is a longitudinal section on the line 3 3 of Fig. 2.

In the practice of my invention I provide a combined sofa and bed which consists of three separate parts, the first part 5, as shown in the drawings, consisting of an oblong rectangular box or frame which is designed to serve as a receptacle for bedclothing and other articles and also as a base or a support for the sofa or bed. This base part or frame 5 is composed of a back 6, a bottom 7, end pieces 8, and a front 9, and the second part 10 rests thereon and is similar in form, consisting of end pieces 11, a front piece 12, and a back strip 13, and the back strip 13 and the front piece 10 are connected by cross strips or slats 14, designed to support the upholstering.

The third part, which is designed to form the back of the sofa and also a portion of the bed when the device is used as a bed, is shown at 15 and is similar in form to the base frame or box 5 and also to the second part 10, which is hinged thereto, and comprises end pieces 16, a front strip 17, and back strip 18, and the front strip and back strip are also connected by cross strips or slats 19.

Secured to the back portion of the bottom box or casing and near each corner thereof is a strong piece of angle-iron 20, which projects upwardly and is provided with an outwardly-directed arm 21, which forms at its extremity the pivot upon which, as will be later explained, both the frame 10 and 15 are hinged. This angle-iron 20 thus forms a union between the three frames 5, 10, and 15. The height of the angle-iron 20 above the base box or frame 5 is substantially the same as that of the end pieces 11 of the second part of the device, which constitutes the seat of the sofa. Secured to the end pieces 11 of the second part 10 are metal plates 23, and corresponding metal plates 24 are secured to the end pieces 16 of the part 15, and the plate 23 is provided with a backwardly-directed segmental extension 26, as shown in dotted lines in Fig. 2, and the plates 23 and 24 are connected with the angle-piece 20, so as to form the hinge.

Pivoted within the end pieces 11 at 27 are levers 28, and dogs 29 are pivoted to the plates 23 at 30, and the inner ends of said dogs are forced outwardly by springs 31, and the levers 28 bear on the inner ends of the dogs 29 at 32, and the outer ends of the dogs 29 are provided with outwardly-directed arms 33, which are adapted to press through the opening or perforation 34 in the plate 23 and through the opening 34[a] in plate 24 when these openings coincide, as they will when the seat and back are at right angles.

The free ends of the levers 27 are connected by a cord, chain, strap, or other device 35, which extends longitudinally across the part 10, which constitutes the seat of the sofa and which passes through keepers 36 and which may be manipulated as desired to pull the free ends of the levers 28 inwardly, and this operation will depress the inner ends of the dogs 29 or force them toward the end pieces 11, so as to disengage the arms 33 thereof from the perforations or openings 34 and 34[a].

Pivotally connected with the back of the base box or frame 5 and at each end thereof are rods 37, which are connected with sliding bars 38, which pass through keepers 39, secured to the inner sides of the end pieces 16 of the part 15, which constitutes the back of the sofa, and the outer or upper ends of these sliding bars 38 are pivotally connected with the legs 40, said legs being pivoted to the end pieces 16, as shown at 41, and as the back of the sofa or part 15 of the device is moved backwardly to the position shown in Fig. 2 the legs 40 will be turned down by the rods 37, the sliding bars 38, and the rods 39, and when the said back is again raised this operation will be reversed and the legs 40 will be folded into the position shown in Fig. 1. I also prefer to provide means for locking the seat 10 to the base box or frame 5, which consists of slots 42, formed in the front of the base box or frame 5 and in which are pivoted crank-levers 43, with each of which is connected a rod 44, said rods being connected with a disk 45, which is provided with a shaft 46, having a head 47.

The shaft 46 extends through the front 12 of the seat 10 and is adapted to be operated from the front thereof, and the rods 44 are each connected with the upper side of the disk 45, and secured to the crank-levers 43 are springs 48, which serve to draw the upper ends of said levers both to the right.

The lower ends of the crank-levers 43 are provided with heads by which the front of the seat or part 10 is locked to the bottom frame or box 5, and the springs 48 serve to hold these heads in operative position, and by turning the handle or head 47 of the shaft 46 to the left both of the rods 44 will be moved in the same direction and the locking-levers 43 will be disengaged from the front 9 of the bottom box or frame 5 and the seat portion 10 of the device may be raised, and through the mechanism already described this movement will result in lowering the back. It is obvious that instead of two rods 44 a single rod may be used.

In the operation of my combined sofa and bed, the same being in the shape of a sofa and it being desired to convert it into a bed, the following is the procedure: Grasping the key 47 and turning the same to the left the seat portion 10 is thereby unlocked from the base-frame 5. Lifting by means of this key, the sofa having first been drawn forward from the wall, the seat portion is carried from a horizontal to an upright position, and the back 15, being rigidly locked at right angles to the seat portion 10, travels from an upright backwardly to a horizontal position, and this same operation forces the legs 40 into position to support the back 16. Releasing the key 47, I now grasp the cord 36, projecting through the slats and from the under side of the seat portion 10, and by pulling upon this cord I disengage the dogs 33 through the mechanism before described, thus releasing the back portion 15 from the seat portion 10, and leaving the back portion 15 in its horizontal position I lower the seat portion 10 to its original position, and thus have a bed formed of the back and seat portions lying side by side and which I have thus converted from the sofa without moving during the operation from my position in the front of the device.

In converting from a bed to a sofa the *modus operandi* is as follows: Grasping the key 47 again, unlock, as before, raise the seat to an upright position, and when at right angles with the back the dogs 33 will automatically lock the seat and back together. Then draw the seat forward and lower to the horizontal. The back will follow and the automatic legs will fold in.

It will be understood that the back or part 15 and the seat or part 10 are upholstered in any desired manner, and it is evident that changes in and modifications of the construction herein described may be made without departing from the spirit of my invention or sacrificing its advantages.

Having fully described my invention, what I claim as new, and desire to secure by Letters Patent, is—

1. A combined sofa and bed comprising a base-box, seat and back, standards or angle-irons rising from said base-box and upon which said seat and back are independently pivoted or hinged, and means for locking said seat and back together in substantially right-angular position whereby said seat and back are adapted to pivotal movement without change of relative position to each other and for unlocking or releasing said seat and back and adapting the same to independent pivotal movement, substantially as described.

2. A combined sofa and bed comprising a base-box, seat and back, standards or angle-irons rising from said base-box and upon which said seat and back are independently pivoted or hinged, means for locking said seat and back together in substantially right-angular position whereby said seat and back are adapted to pivotal movement without change of relative position to each other and for unlocking or releasing said seat and back and adapting the same to independent pivotal movement, and folding legs provided in connection with said back adapted to be operated by the pivotal movement thereof, substantially as described.

3. The combination, of base-box, seat and back, uprights or standards rising from the base-box, said seat and back pivoted or hinged thereon, dogs carried by one of said pivoted members and adapted to lock said seat and back together when the same assume a substantially right-angular position, and means for releasing said dogs to permit independent pivotal movement of said seat and back, substantially as described.

4. The combination, of base-box, seat and back, uprights or standards rising from the base-box, said seat and back pivoted or hinged thereon, dogs carried by one of said pivoted members and adapted to lock said seat and back together when the same assume a substantially right-angular position, means for releasing said dogs to permit independent pivotal movement of said seat and back, and folding legs carried by said back and adapted to be operated by pivotal movement thereof, substantially as described.

5. The combination, of base-box, seat and back, uprights or standards rising from said base-box, hinge or pivot plates by which said seat and back are independently pivoted or hinged thereon, dogs 29 on said seat adapted to lock said seat and back together, operating-levers 28, and an operating connection, substantially as described.

6. The combination, of base-box, seat and back, uprights or standards rising from said base-box, hinge or pivot plates by which said seat and back are independently pivoted or hinged thereon, dogs 29 on said seat adapted to lock said seat and back together when said seat and back assume a substantially right-angular position, operating-levers 28, an operating connection, and folding or pivoted legs carried by said back and operatively connected with said standards or base-box whereby the pivotal movement of said back operates said legs, substantially as described.

7. A combined sofa and bed consisting of three parts which are similar and oblong in form, one of said parts forming a base box or frame, another the seat of the sofa, and the third the back, said parts being hinged together at the back of the base box or frame, and the third part or back being adapted to fold backwardly into a horizontal position, the seat and back being hinged together and to the base box or frame, and means for locking the front of the seat to the base frame or box and for locking the back in an upright position substantially as shown and described.

8. A combined sofa and bed comprising the base-box, the angle-irons connected to the back of said box and having outwardly-turned ends, the seat and back both hinged upon said outwardly-turned ends and pawls or dogs for locking said seat and back together, substantially as described.

In testimony whereof I have hereunto set my hand this 28th day of March, A. D. 1900.

WILLIAM T. ROLPH.

In presence of—
EDWARD G. CURTIS,
OSCAR H. BENNER.